(12) United States Patent
Chen et al.

(10) Patent No.: US 7,208,686 B1
(45) Date of Patent: Apr. 24, 2007

(54) COMPUTER FRONT BEZEL ASSEMBLY

(75) Inventors: Yun-Lung Chen, Shenzhen (CN); Yu-Ming Xiao, Shenzhen (CN)

(73) Assignees: Hong Fu Jin Precision Industry (Shenzhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/308,945

(22) Filed: May 29, 2006

(30) Foreign Application Priority Data

Dec. 30, 2005 (CN) ........................ 200520121455.5

(51) Int. Cl.
*H01R 13/502* (2006.01)
(52) U.S. Cl. .................. 174/561; 174/559; 312/223.2; 361/683
(58) Field of Classification Search ................ 174/559, 174/561; 361/683; 312/223.2
See application file for complete search history.

(56) References Cited

U.S. PATENT DOCUMENTS

| 6,288,333 | B1 | 9/2001 | Liu et al. | |
| 6,555,747 | B2 | 4/2003 | Chen et al. | |
| 7,082,036 | B2* | 7/2006 | Cheng et al. | 361/726 |
| 2003/0202319 | A1* | 10/2003 | Chen | 361/683 |
| 2003/0210529 | A1* | 11/2003 | Chen | 361/725 |
| 2004/0119384 | A1* | 6/2004 | Davis et al. | 312/223.2 |
| 2004/0120107 | A1* | 6/2004 | Davis et al. | 361/683 |
| 2004/0160149 | A1* | 8/2004 | Chen | 312/223.2 |
| 2005/0062374 | A1* | 3/2005 | Chen et al. | 312/223.2 |
| 2006/0226743 | A1* | 10/2006 | Chen | 312/223.2 |
| 2007/0013276 | A1* | 1/2007 | Chen et al. | 312/223.2 |

* cited by examiner

*Primary Examiner*—Hung V. Ngo
(74) *Attorney, Agent, or Firm*—Wei Te Chung

(57) ABSTRACT

A computer front bezel assembly includes a front panel (10), a front bezel (30), and a driving member (50). The front panel defines a securing opening (14). The front bezel is attached to a first surface of the front panel. A resilient engaging portion (38) with barb-shaped end is formed on the front bezel for engaging with the securing opening. The driving member is attached to a second surface of the front panel. The second surface is opposite to the first surface. The front panel includes a driving clip (572). When the driving member is slid, the driving clip urges the resilient engaging portion to deform, thereby the resilient engaging portion disengaging from the securing opening of the front panel.

19 Claims, 6 Drawing Sheets

COMPUTER FRONT BEZEL ASSEMBLY

FIELD OF THE INVENTION

The present invention relates to a computer front bezel assembly, and more particularly to a computer front bezel assembly with detachable front bezel.

DESCRIPTION OF RELATED ART

A computer enclosure typically includes a front bezel, a front plate, and a cage. The front bezel usually mounts to the front side of the computer enclosure for shielding and aesthetic purposes. The bezel has to be dismounted from the computer enclosure when replacing or adding new components, such as a CD-ROM or a floppy disk drive. Thus, the bezel must have a structure capable of being frequently mounted and dismounted without being damaged or broken.

A conventional computer enclosure includes a cage and a bezel. The cage includes a front plate defining a plurality of locking openings and locating holes, and a bottom plate defining a pair of locking apertures. The bezel has a plurality of engaging hooks engaging with the front plate in the corresponding locking openings. A plurality of locating posts is received in the corresponding locating holes. The bezel also has a pair of arcuate supporting feet. Each supporting foot includes a horizontal surface abutting against a bottom surface of the bottom plate. A catch abuts against a top surface of the bottom plate near the corresponding locking aperture. When the bezel is attached to the cage, the supporting feet are elastically deformed to cause the bezel to be firmly attached to the front plate of the cage.

However, we need to use both hands to detach the engaging hooks from the corresponding locking openings of the cage. Thus, it is inconvenient to detach the front bezel frequently from the computer manually when we add new devices to the computer.

What is needed, therefore, is a driving member which can urge the front bezel to detach from the computer enclosure conveniently.

SUMMARY OF INVENTION

A computer front bezel assembly includes a front panel, a front bezel, and a driving member. The front panel defines a securing opening. The front bezel is attached to a first surface of the front panel. A resilient engaging portion with a barb-shaped end is formed on the front bezel for engaging with the securing opening. The driving member is attached to a second surface of the front panel. The second surface is opposite to the first surface. The front panel includes a driving clip. When the driving member is slid, the driving clip urges the resilient engaging portion to deform, thereby the resilient engaging portion disengaging from the securing opening of the front panel.

Other advantages and novel features will be drawn from the following detailed description of a preferred embodiment with attached drawings, in which:

DETAILED DESCRIPTION

Figure 1:
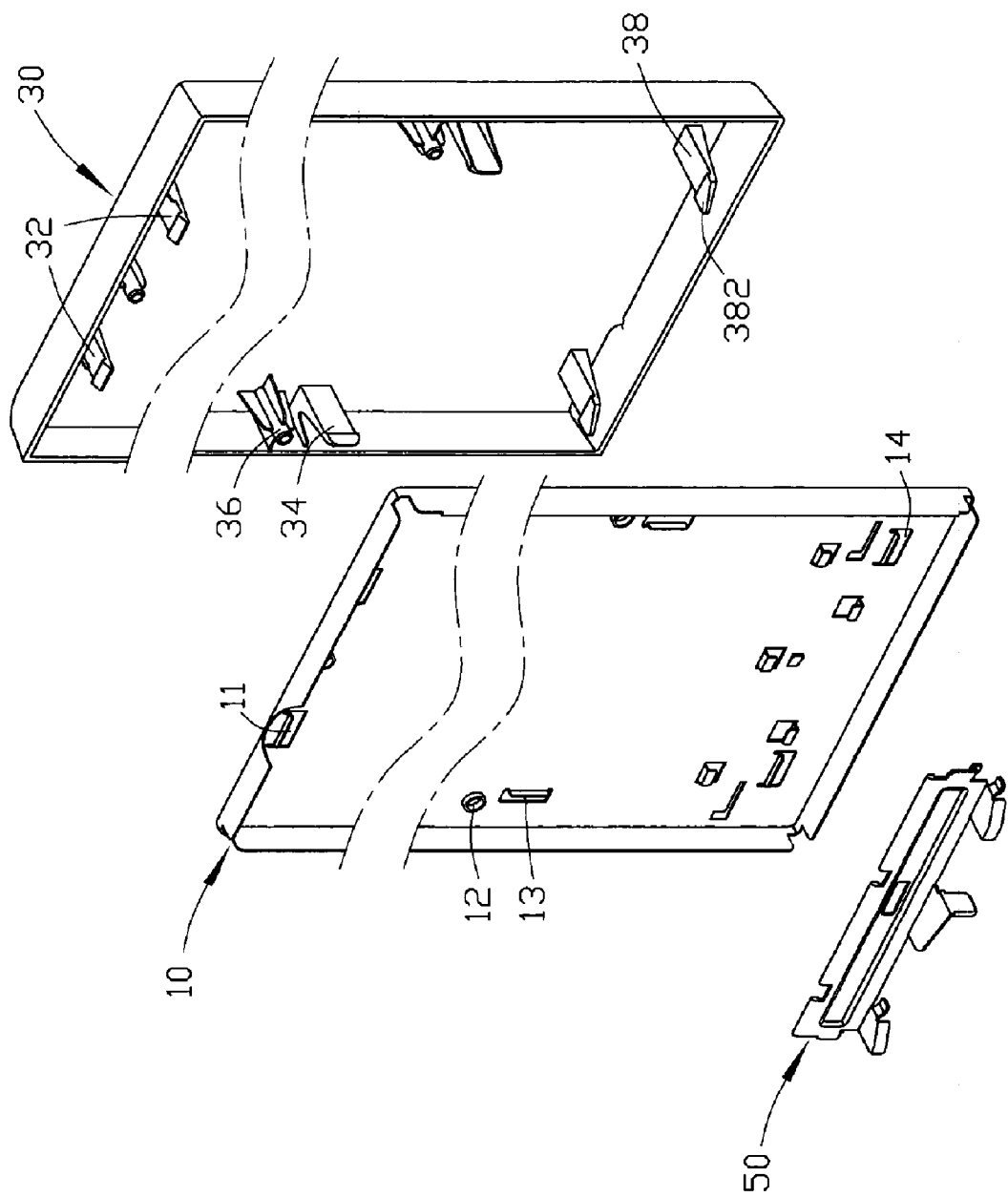
FIG. 1 is an exploded, abbreviated, isometric view of a computer front bezel assembly of a preferred embodiment of the present invention, the computer front bezel assembly including a front bezel, a front panel, and a driving member.

Referring to FIG. 1, a front bezel assembly of an electronic device like a computer includes a front panel 10, a front bezel 30, and a driving member 50 for detaching the front bezel 30 from the front panel 10.

Figure 2:
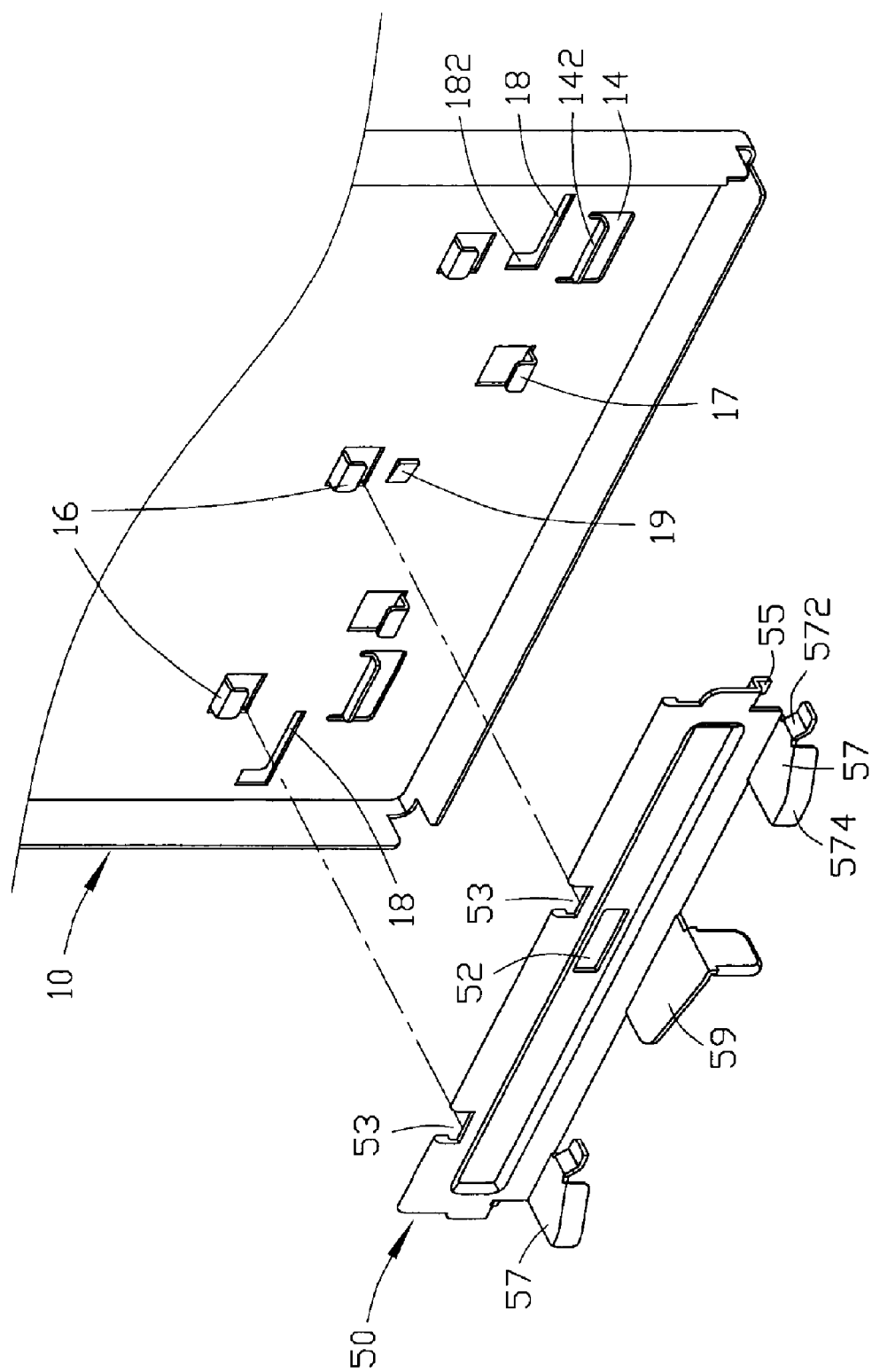
FIG. 2 is an enlarged view of the driving member and part of the front panel of FIG. 1.

Referring to FIG. 1 and FIG. 2, the front panel 10 defines three pairs of securing openings 11, 13, 14 in a top portion, a middle portion, and a bottom portion respectively. An orienting hole 12 is defined near each securing opening 13 in the front panel 10. Three hooks 16 with free ends extending down are formed on the bottom portion of the front panel 10. The three hooks 16 are on a same line and spaced evenly apart. Two hooks 17 with free ends extending up are formed on another same line below the same line of the hooks 16, and each hook 17 is respectively aligned between each two adjacent hooks 16 on the front panel 10. A distance between the same line of the hooks 16 and the another same line of the hooks 17 is the same as or a little greater than a distance from a top edge of the driving member 50 and a bottom edge of the driving member 50. The hooks 16 and 17 cooperate to retain the driving member 50. A resilient tab 19 is formed between the hooks 17 on the front panel 10. The resilient tab 19 projects generally horizontally towards one side of the front panel 10. A pair of L-shaped sliding slots 18 is defined near opposite edges of the front panel 10 and adjacent the hooks 17 respectively. Each sliding slot 18 has a directing portion 182.

Three pairs of resilient engaging portions 32, 34, and 38 each with barb shaped free ends extend in and perpendicular from an inner surface of the front bezel 30, respectively corresponding to the securing openings 11, 13, and 14 of the front panel 10. A cuneiform securing tab 382 is formed on a distal end of each resilient engaging portion 38. A pair of orienting posts 36 extends from the inner surface of the front bezel 30 corresponding to the orienting holes 12 of the front panel 10.

Figure 3:
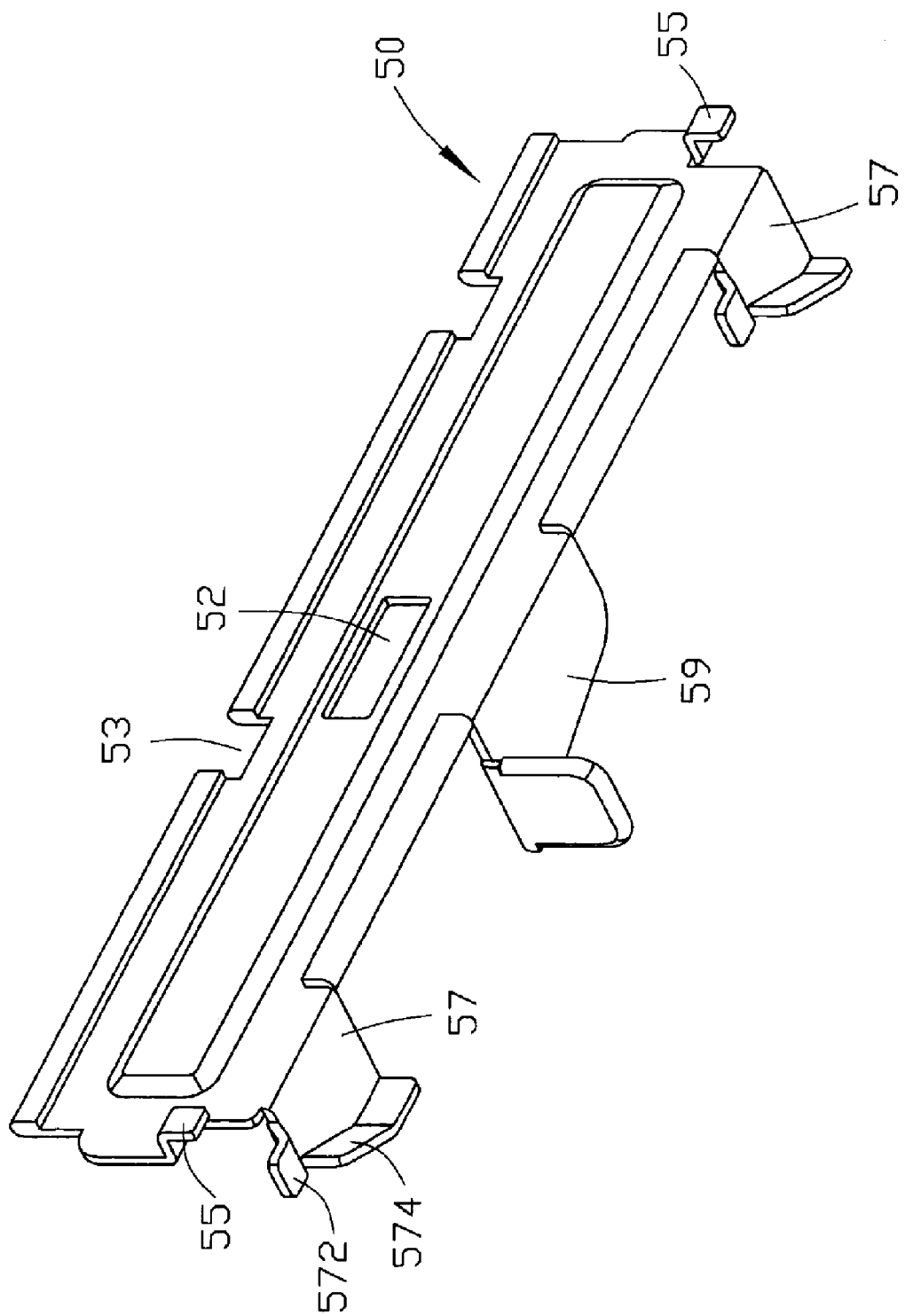
FIG. 3 is an enlarged, isometric, inverted view of the driving member of FIG. 1.

Referring also to FIG. 3, two cutouts 53 are defined at the top edge of the driving member 50 corresponding to two of the hooks 16 of the front panel 10. A rectangular retaining opening 52 is defined in a middle portion of the driving member 50, corresponding to the resilient tab 19 of the front panel 10. A pair of holding tabs 55 is formed at a bottom edge of the driving member 50 corresponding to the sliding slots 18 of the front panel 10. A pair of driving portions 57 is formed horizontally out from the bottom edge of the driving member 50 corresponding to the securing openings 14 of the front panel 10. Each driving portion 57 includes a driving clip 572 formed on a side edge away from a center of the driving member 50, and a flange 574 formed along an outside edge. The driving clips 572 each have a portion slanting down and away from the driving portion 57 in a same direction. The flanges 574 each have a portion slanted towards the driving member 50 in a same direction. An L-shaped operating portion 59 is bent from a middle portion of the bottom edge of the driving member 50 for operating the driving member 50.

Figure 4:
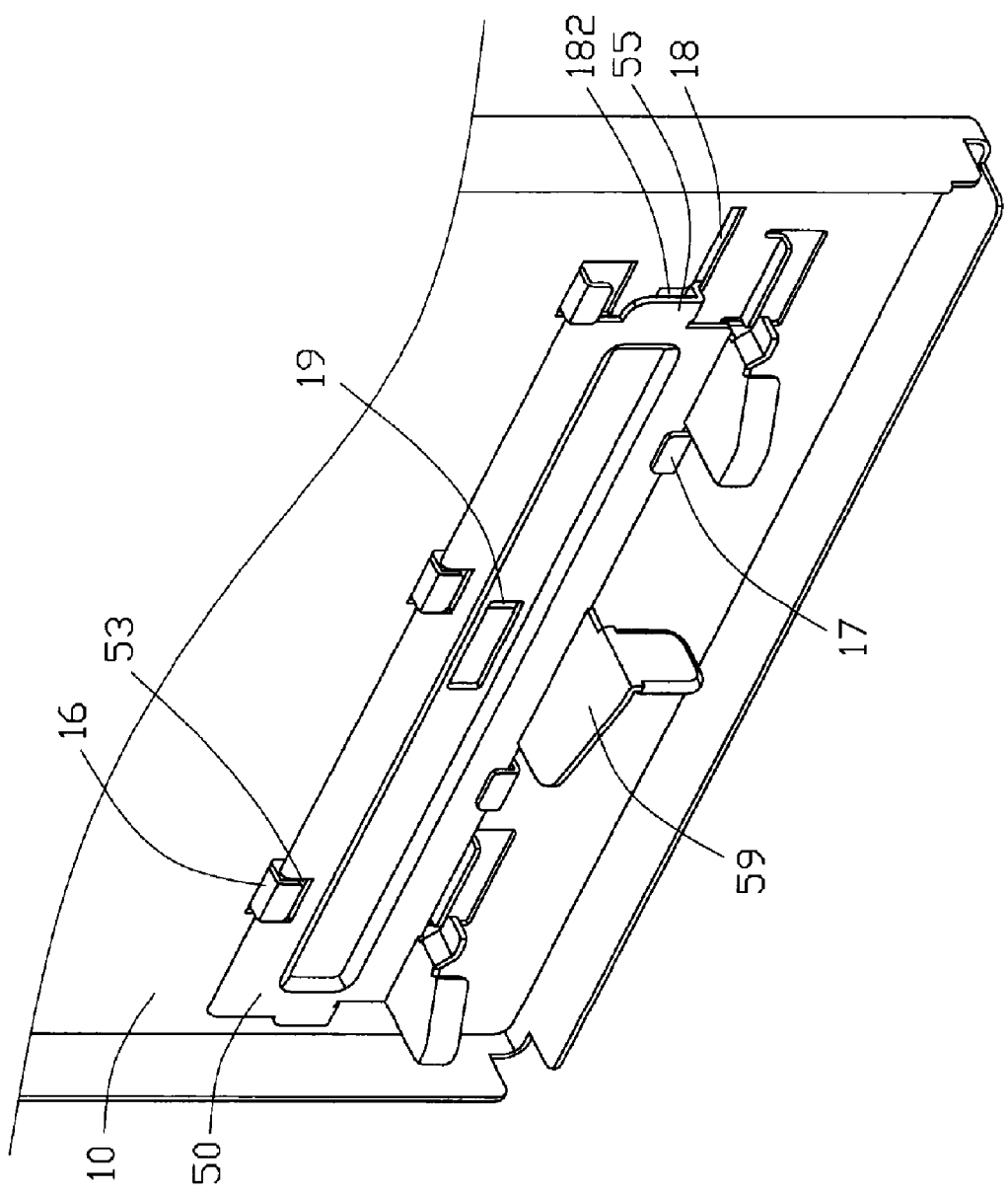
FIG. 4 is an assembled view of the driving member and the part of the front panel of FIG. 1.

Referring also to FIG. 4, in assembling the driving member 50 to the front panel 10, the bottom edge of the driving member 50 is first positioned on the hooks 17 of the front panel 10. Then the driving member 50 is swiveled toward the front panel 10 so that the holding tabs 55 are inserted into the corresponding sliding slots 18 of the front panel 10 via corresponding directing portions 182 thereof. At the same time, the two of the hooks 16 of the front panel 10 are received in the corresponding cutouts 53 of the driving member 50. Also at the same time, the resilient tab 19 of the front panel 10 is elastically deformed towards the front panel 10. Then the driving member 50 is urged to slide, by a user pushing against the operating portion 59, along the slots 18 of the front panel 10 along a direction so that the top edge of the driving member 50 is retained behind the free ends of all three hooks 16. When the retaining opening 52 moves over the resilient tab 19 of the front panel 10, the resilient tab 19 rebounds back to an original form. At this time the driving member 50 is in a locked position and the driving portions 57 overhang the securing openings 14. The distal end of the resilient tab 19 abuts against an edge of the retaining opening 52 opposite the direction of the previous sliding motion. Thus, the driving member 50 is assembled to the front panel 10.

Figure 5:
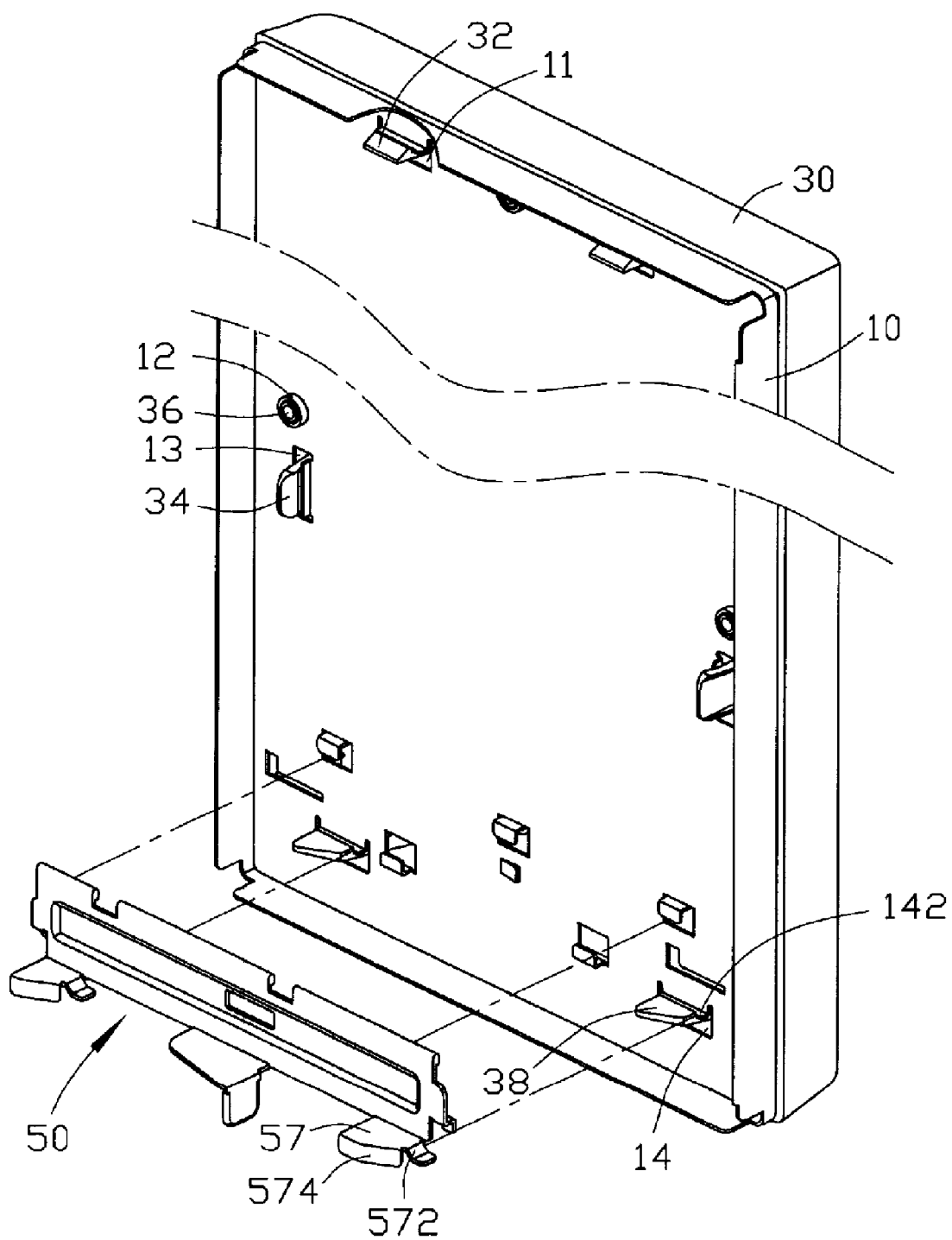
FIG. 5 is an enlarged, partially assembled view of the computer front bezel assembly of FIG. 1.

Referring also to FIG. 5, in securing the front bezel 30 to the assembled front panel 10 and driving member 50. With the driving member 50 in the locked position, the orienting posts 36 of the front bezel 30 are inserted into the orienting holes 12 of the front panel 10. The resilient engaging portions 32, and 34 engage with the front panel 10 in the corresponding securing openings 11, 13 respectively. Each securing tab 382 of the resilient engaging portions 38 engages with a securing flange 142 of the corresponding securing openings 14. The front bezel 30 is thus firmly attached to the front panel 10.

Figure 6:
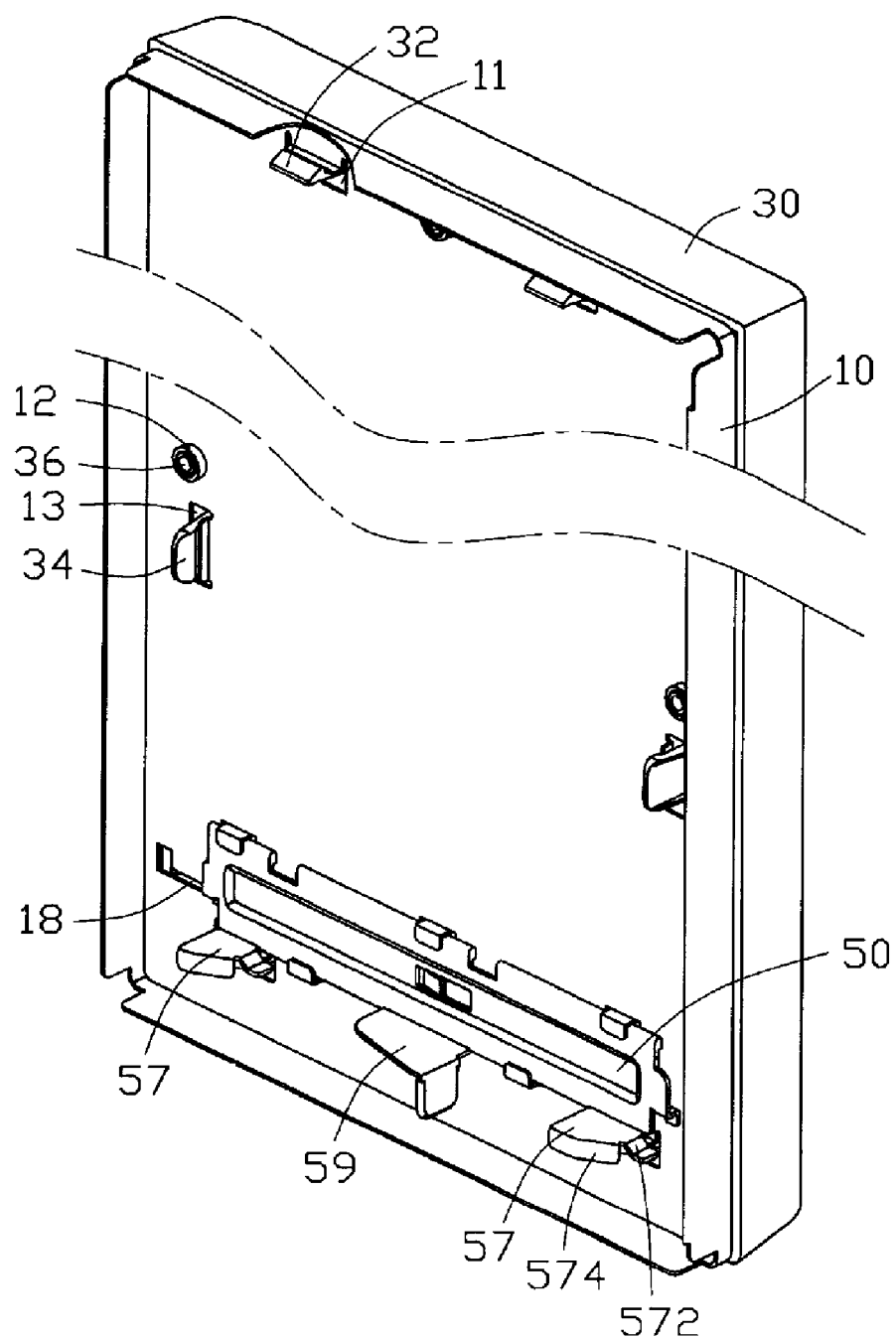
FIG. 6 is a fully assembled view of the computer front bezel assembly of FIG. 1.

Referring also to FIG. 6, when detaching the front bezel 30 from the front panel 10, the user pushes the operating portion 59 to urge the driving member 50 to slide in an opposite direction as that in the assembly of the driving member 50 to the front panel 10, toward an unlocked position. The driving clips 572 of the driving member 50 drive the resilient engaging portions 38 to deform downwardly, thereby the securing tabs 382 of the portions 38 disengaging from the securing edges 142 of the securing openings 14. As the driving member 50 is further slid, the slanted flanges 574 of the driving member 50 push the portions 38 to move out of the securing openings 14 respectively and releasing the resilient engaging portions 34 from their engagement with the openings 13. At this point the front bezel 30 is at an angle compared to the front panel 10 with the engaging portions 34 merely resting within the openings 13 and the engaging portions 32 still engaged with the openings 11. Subsequently, as the front bezel 30 is rotated about a top edge thereof and moved away from the front panel 10, the resilient engaging portions 34 and 32 are completely disengaged from the front panel 10. The front bezel 30 is then detached from the front panel 10.

It is to be understood, however, that even though numerous characteristics and advantages have been set forth in the foregoing description of a preferred embodiment, together with details of the structure and function of the preferred embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer front bezel assembly, comprising:
a front panel defining a securing opening;
a front bezel attached to a first surface of the front panel, a resilient engaging portion with a barb-shaped end formed on the front bezel for securing with the securing opening; and
a driving member attached to a second surface of the front panel, the second surface opposite to the first surface, the driving member comprising a driving clip, wherein when the driving member is slid, the driving clip urges the resilient engaging portion to deform, thereby the resilient engaging portion disengaging from the securing opening of the front panel.

2. The computer front bezel assembly as described in claim 1, wherein the engaging portion has a cuneiform securing tab at an end thereof.

3. The computer front bezel assembly as described in claim 2, wherein a securing flange is formed on an edge of the securing opening, and the securing flange is engaged with the securing tab of the resilient engaging portion.

4. The computer front bezel assembly as described in claim 1, wherein a slanted flange is formed on the driving member for urging the resilient engaging portion to move away from the front panel, when the driving member is slid.

5. The computer front bezel assembly as described in claim 1, wherein the driving clip has a slanted portion for urging the resilient engaging portion to deform.

6. The computer front bezel assembly as described in claim 1, wherein at least two hooks with opposite free ends are formed on the front panel as to cooperate together for holding the driving member.

7. The computer front bezel assembly as described in claim 1, wherein a retaining opening is defined in the driving member, and a resilient tab is formed on the front panel corresponding to the retaining opening for restricting movement of the driving member.

8. The computer front bezel assembly as described in claim 1, wherein at least one sliding slot is defined in the front panel, and a holding tab is formed on the driving member corresponding to the sliding slot for guiding the driving member.

9. The computer front bezel assembly as described in claim 1, wherein the front bezel further comprises at least one engaging portion for securing the front bezel to the front panel.

10. A front bezel detaching assembly comprising:
a front bezel, a resilient engaging portion with a barb-shaped end extending perpendicularly from thereon;
a front panel, a securing opening defined thereon engaged with the engaging portion; and
a driving member attached to the front panel, comprising a driving portion, the driving portion having a flange extending slantedly with respect to the front panel, when the driving portion is slid, the flange urging the engaging portion to recede from the securing opening.

11. The detaching apparatus as described in claim 10, wherein the engaging portion has a cuneiform securing tab at an end thereof.

12. The detaching apparatus as described in claim 11, wherein a securing flange is formed on an edge of the securing opening engaged with the securing tab of the engaging portion.

13. The detaching apparatus as described in claim 10, wherein a slanted driving clip is formed on the driving portion for deforming the engaging portion of the front bezel.

14. The detaching apparatus as described in claim 10, wherein the front bezel is attached on a first side of the front panel, and the retaining member is attached on an opposite side of the front panel.

15. The detaching apparatus as described in claim 10, wherein a retaining opening is defined in the driving member, and a resilient tab is formed on the front panel corresponding to the retaining opening for restricting movement of the driving member.

16. The detaching apparatus as described in claim 10, wherein the front bezel further comprises at least one engaging portion for securing the front bezel to the front panel.

17. The detaching apparatus as described in claim 10, wherein at least one sliding slot is defined in the front panel, and a holding tab is formed on the driving member corresponding to the sliding slot for guiding the driving member.

18. An electronic device comprising:
   a panel of said electronic device extending along a side of said electronic device to shield said side of said electronic device;
   a bezel removably attachable to said panel to cover said panel, said bezel comprising at least one engaging portion extending toward said penal and engagable with said panel via an end thereof so as to retain said bezel to said panel, said end of said at least one engaging portion protruding through said panel to be located at a first side of said panel opposite to a second side of said panel where said bezel is attachably located when said bezel is readily attached to said panel; and
   a driving member movably attachable to said panel at said first side thereof, and comprising a driving portion corresponding to said at least one engaging portion and extending beside said end of said at least one engaging portion through said panel when said bezel is readily attached to said panel, engagement of said driving portion and said end of said at least one engaging portion urging said end of said at least one engaging portion to move along at least two different directions so as to release said bezel by disengaging said at least one engaging portion from said panel.

19. The electronic device as described in claim 18, wherein said driving portion comprises a flange to drive said end moving along one of said at least two directions, and a driving clip to drive said end moving along another of said at least two directions.

* * * * *